United States Patent [19]

Cosper et al.

[11] 4,378,235

[45] Mar. 29, 1983

[54] SCRUBBING MEDIA FOR REMOVING VOLATILE ORGANIC MATERIAL FROM PAINT SPRAY BOOTHS

[75] Inventors: David R. Cosper, Downers Grove; William H. Lindenberger, Naperville, both of Ill.

[73] Assignee: Nalco Chemical Company, Oak Brook, Ill.

[21] Appl. No.: 308,051

[22] Filed: Oct. 5, 1981

[51] Int. Cl.$^3$ .............................................. B01D 47/00
[52] U.S. Cl. ........................................ 55/85; 252/312; 252/330; 55/89; 55/45; 210/708
[58] Field of Search ......................... 55/84, 85, 89, 45; 252/312, 330; 210/708; 98/115 SB

[56] References Cited

U.S. PATENT DOCUMENTS

| | | | |
|---|---|---|---|
| 1,686,491 | 10/1928 | Hughes et al. | 252/330 |
| 1,872,617 | 8/1932 | Brown | 252/312 |
| 3,419,494 | 12/1968 | Teeter et al. | 252/312 |
| 3,943,954 | 3/1976 | Flournoy et al. | 252/312 |
| 4,102,303 | 7/1978 | Cordier et al. | 55/85 |
| 4,220,456 | 9/1980 | Block | 55/85 |
| 4,261,707 | 4/1981 | Bradshaw et al. | 55/85 |
| 4,265,642 | 5/1981 | Mir et al. | 55/85 |
| 4,339,248 | 7/1982 | Garner . | |

FOREIGN PATENT DOCUMENTS

| | | | |
|---|---|---|---|
| 2511181 | 9/1976 | Fed. Rep. of Germany | 55/90 |
| 49-52990 | 5/1974 | Japan . | |
| 51-41677 | 4/1976 | Japan | 55/84 |

*Primary Examiner*—Bernard Nozick
*Attorney, Agent, or Firm*—John G. Premo; Robert A. Miller

[57] ABSTRACT

An improved method for recovering volatile organic paint carrier from paint spray booths of the type comprising a chamber, a duct system for passing air down through such chamber to remove volatile organic paint carrier and over-sprayed paint particles, a sump containing a circulating hydrophilic liquid located at the bottom of the chamber adapted to remove volatile organic paint carrier and paint particles from the air containing them, the improvement which comprises using as the hydrophilic liquid an oil-in-water emulsion which has the following composition:

(a) 1–50% by weight of an organic liquid having a boiling point of at least 150°C.;
(b) 0.1–30% by weight of the organic liquid of a sulfonate-free oil-in-water emulsifier;
(c) balance, water, said emulsion having a pH within the range of 7.5–12.0 and being further characterized as being rapidly broken when the pH is reduced below 6.5.

7 Claims, No Drawings

SCRUBBING MEDIA FOR REMOVING VOLATILE ORGANIC MATERIAL FROM PAINT SPRAY BOOTHS

INTRODUCTION

Great quantities of paints, lacquers, and varnishes are used in the automobile, appliance, and allied industries to coat finished products. These paints, lacquers, and varnishes are generally solvent-based. In the use of these materials, generally in enclosed areas called paint spray booths, substantial quantities of solvent and over-sprayed paint solids are discharged into the atmosphere. These materials represent environmental hazards which have to be controlled. Current paint spray booths comprise a chamber, a duct system for passing air down through such chamber to remove volatile organic paint carriers and over-sprayed paint particles present in the chamber into a sump containing a circulating hydrophilic liquid located at the bottom of the chamber which has been adapted to remove volatile organic paint carriers and paint particles from the air containing them. This system has generally been satisfactory for removing paint particles but has not been effective for removing the volatile organic components present as paint carriers.

Paint spray booths generally represent major items of capital expense and as such, replacing paint spray booths with more effective systems which would enable removal of volatile organic carriers would be prohibitively expensive. As such, it is important to find a method for modifying existing equipment so that this existing equipment can recover volatile organic carriers rather than discharge volatile organic carriers into the atmosphere.

The prior art shows the use of various materials to be employed as fluids in the sump of paint spray booths which will trap paint particles and which act as solvents for volatile organic carriers. References employing oil-in-water emulsions for this purpose include Japanese Kokai No. 52990 76 and U.S. Pat. No. 4,265,642.

In the Japanese reference, an oil-in-water emulsion of a purified white oil mixed with a detergent such as alkyl benzene sulphonic acid is used to scrub volatile organic carriers from contaminated air. The emulsion is used in an absorption tower to trap volatile organic carriers. While systems of this type could be effective, no mention is made of reusing this emulsion. Since materials of this type, which include petroleum products, are expensive without reuse of this emulsion, procedures of this type tend to be impractical.

In U.S. Pat. No. 4,265,642 there is disclosed a method for the removal of volatile organic carriers from the air in paint spray booths using an oil-in-water emulsion. While the oil-in-water emulsion is reusable, ultrafiltration is used to separate the components of the emulsion to allow recovery of a solvent or oil phase from which volatile organic carriers can be distilled. Ultrafiltration techniques for handling large volumes of continuously recirculated liquid present in paint spray booths are impractical. Large paint spray booths of this type generally employ circulation of up to 10,000 gallons per minute of liquid and the ultrafiltration of even a small fraction of this amount is economically impractical.

Accordingly, it would be an advance to the art if a method could be developed for the recovery of volatile organic carriers from paint spray booth systems using an economical absorbing fluid for the volatile organic carriers which could be continuously reused.

A further object of this invention is to provide to the art an oil-in-water emulsion useful for removing volatile organic carriers from paint spray booth systems which will be easily breakable to recover a hydrocarbon phase from which volatile organic carriers can be distilled and which can then be readily recyclable to the paint spray booth system.

This invention is premised upon an oil-in-water emulsion which will absorb volatile organic paint carriers from the air in paint spray booths. The oil-in-water emulsions of the subject invention can be rapidly broken to yield an oil phase consisting of the organic liquid which is used to form the emulsion and volatile organic paint carrier material from the paint spray booth as well as an aqueous phase. The hydrocarbon or oil phase of the emulsion can then be treated to recover volatile organic paint carriers and can subsequently be recombined with the separated aqueous phase to form a new emulsion which can be continously recirculated to the paint spray booth.

THE INVENTION

We have discovered an improved method for recovering volatile organic carriers from paint spray booth systems. The paint spray booths of the type for which this invention is designed may be of a wet wall, center draft, or other construction. Paint spray booths of these types operate, in a sense, as large gas scrubbers with air passing through the booth picking up substantial quantities of volatile organic carriers, and paint particles that do not meet the object being painted. The air, after picking up these materials, passes into a sump or the like where it is intimately contacted with a hydrophilic fluid which is generally recirculated throughout the paint spray booth. The hydrophilic fluid serves to trap oversprayed paint particles to prevent their release into the atmosphere and, also, has served to some extent, to trap the organic vapors collected from the booth.

The organic vapors that are generally encountered in paint spray booths of the type described consist of aromatic materials such as benzene, xylene, and toluene, low boiling ethers, esters, and ketones such as methylisobutyl ketone, methylamyl ketone, and the like. Accordingly, the hydrophilic liquid scrubbing media which is employed must act as a solvent for these types of volatile organic paint carriers.

Accordingly, the essence of this invention is an oil-in-water emulsion system which comprises an organic liquid having a boiling point of at least 150° C., a sulfonate-free oil-in-water emulsifier, and water. Oil-in-water emulsions which are the subject of this invention should have the additional characteristics of being able to be rapidly broken so as to separate distinct oil and water phases, and all components after removal of the volatile organic carriers should be readily reusable.

Before briefly describing the process in which the oil-in-water emulsions of this invention are utilized, the following explanation is presented for each of the components of the oil-in-water emulsions of this invention.

The Organic Liquid

The organic liquid component of the oil-in-water emulsions of this invention should be non-volatile, water-immiscible, hydrocarbon materials which have the further characteristic of acting as a solvent for volatile organic paint carriers present in paint spray booths.

Organic liquids employed may be primarily aliphatic, paraffinic, aromatic or mixtures thereof. The organic liquids may either be halogenated or non-halogenated and should generally have a boiling point greater than 150° C. and, preferably, 200° C., and most preferably, above 300° C. Viscosities of materials used may range from that of a 100 SEC primarily aliphatic petroleum process oil to that of a highly chlorinated paraffinic material having viscosities in excess of 20,000 cps. Thus, the only criteria for materials of this type are those stated above. Typical materials which can be employed include Telura ® 323, a process oil manufactured by Exxon Company, U.S.A., which is categorized as having a boiling point of from 545°–884° F., negligible solubility in water, a specific gravity of 0.903 at 60° F., and a Cleveland open cut flash point of 330° F. and a viscosity at 100° F. of 105–115. This oil is believed to be a complex mixture of aliphatic and aromatic petroleum hydrocarbons. Also useful are various chlorinated paraffinic materials such as those designated Kloro 6000, Kloro 7000, CW 52, CW 170, CW 8560 from the Keil Chemical Division of the Ferro Corporation; as well as Isopar M, a branched paraffinic material available from the Humble Oil & Refinery Company; LOPS, a low odor paraffinic solvent purchased from the Exxon Company U.S.A.; and Marcol 82, a highly aliphatic viscous white oil available from Exxon Company, U.S.A.

For safety purposes, the organic liquid employed in the oil-in-water emulsion of this invention should be substantially non-toxic and have a flash point greater than 250° F. A preferred organic liquid for use in this invention is Telura ® 323 described above.

It will be seen, however, that substantial variations in organic liquids can be accomplished without varying from the spirit and intent of this invention. As an example, 10 weight motor oil has been satisfactorily employed in laboratory experiments.

The Oil-in-Water Emulsifiers

The oil-in-water emulsifiers used in the subject invention will generally have HLB values ranging from 6–40 and, preferably, from 10–30. The oil-in-water emulsifiers employed should provide, when mixed with the organic liquid and water, an oil-in-water emulsion which can be rapidly broken through chemical action, shear, pH change or other means, to provide a distinct hydrocarbon phase and a distinct aqueous phase. The oil-in-water emulsifier selected should also allow rapid reformation of the oil-in-water emulsion from the component parts. Emulsifiers which may be employed in this invention include water-soluble anionic, cationic, and nonionic materials. The preferred emulsifiers for use in this invention are saturated and unsaturated fatty acids and alkali metal salts thereof containing 12–30 and, preferably, 16–24 carbon atoms. Other oil-in-water emulsifiers such as the condensation product of cocoamine reacted with 2 moles of ethylene oxide may be used. The preferred emulsifiers of the invention form emulsions which break when made acidic.

It is expected, however, that oil-in-water emulsifiers other than those specifically enumerated herein may be employed. An especially preferred emulsifier for use in this invention is oleic acid.

Sulfonate-type surfactants are not employed in the subject invention due to the fact that in order to break emulsions formed with this type of surfactant, very low pH values must be obtained. The amount of acid used for this purpose is excessive over that which can be obtained using the preferred classes of surfactants. Likewise, we have found that by themselves, non-ionic surfactants, when employed in this invention, produce an emulsion which is not pH sensitive. While non-ionic surfactants can be employed, when used they must be used with either an anionic or cationic cosurfactant.

In forming emulsions using the preferred fatty acid emulsifying agent, as well as some of the other mentioned emulsifying agents, generally amine, pH sensitive emulsions will result. These emulsions will generally be stable at pH values of from 7.5–12 and, preferably, between 8.0–11. Most preferably, emulsions of this type will be stable at pH values ranging from 8–9.5. Likewise, the preferred emulsions of this invention may be rapidly broken when the pH is reduced below 6.5 and, preferably, to a range of 3.0–6 by the addition of any number of acidic materials. The pH sensitivity of emulsions of this type leads to their great utility in the recovery of volatile organic paint carriers from paint spray booth air.

Water

The water used to from the oil-in-water emulsions of this invention should preferably not contain more than 500 ppm hardness as $Ca^{+2}$ or $Mg^{+2}$. It has been found that excessive hardness in water being used creates soap scum with the preferred fatty acid emulsifiers. If hard water is encountered, however, chelating agents such as NTA and/or EDTA may be added to the water on a 1:1 molar basis to combat hardness.

Formation of the Emulsion

The components of the emulsion are generally used in the following weight percentages:

| A. | Hydrocarbon Oil | |
|---|---|---|
| | Generally | 1–50% by weight of the emulsion |
| | Preferably | 2–40% by weight of the emulsion |
| | Most Preferably | 4–30% by weight of the emulsion |
| B. | Emulsifier | |
| | Generally | .1–30% by weight of the hydrocarbon oil |
| | Preferably | 1–20% by weight of the hydrocarbon oil |
| | Most Preferably | 1.5–10% by weight of the hydrocarbon oil |
| C. | Water | Balance |

The emulsion is formed by simply mixing the above-mentioned ingredients together. As stated above, when using a fatty acid emulsifier, alkaline pH values of from 7.5–12 and, preferably, 8–11, are preferred. Most preferably, the emulsion will have a makeup pH of from 8–9.5. This pH adjustment can be accomplished by merely adding a small quantity of an alkali metal hydroxide, preferably sodium hydroxide, to the water prior to mixing to form the emulsion.

Once the emulsion has been formed, it may be used in paint spray booths as the hydrophilic liquid to capture volatile organic paint carrier materials and oversprayed paints present in the paint spray booth. While selection of the hydrocarbon oil will affect the performance of the emulsion in removing and recovering volatile components therefrom, typical materials which can be recovered from paint spray booths include: toluene, methylamyl ketone, methylethyl ketone, petroleum napthas, diacetone alcohol, acetone, ethyl acetate and the like. As stated above, the hydrocarbon oil used must act as a solvent for the particular volatile organic paint carriers that will be encountered.

After contacting the emulsion with the atmosphere containing the volatile organic materials in the paint spray booth, the emulsion can then be broken. With the preferred emulsions of this invention, those that utilize a fatty-acid type emulsifier or amine types, simple addition of an acid to lower the pH of the emulsion to between 2-6.5 and preferably, from 3.0-6.5, will cause the emulsion to break and separate into two phases. Most preferably, the pH value of the emulsion is adjusted to 3.0-5.5 by the addition of a mineral acid.

For the emulsion to perform satisfactorily in the process, it is important that it break within a short time. This rapid breaking or separation of the emulsion upon appropriate lowering of the pH should occur within $\frac{1}{2}$-45 minutes and, preferably, $\frac{1}{2}$-10 minutes.

After the emulsion has been broken, a large percentage of the volatile organic material will remain in the liquid hydrocarbon phase of the emulsion. This liquid hydrocarbon phase can then be distilled and preferably steam stripped to separate the volatile components therefrom. Thus, a solvent-rich organic phase is treated to recover solvent and the starting organic liquid starting material.

The recovered organic liquid may then be reused with water recovered when the emulsion was broken to reform a new emulsion. In order to accomplish this step, the pH of the emulsion in a preferred embodiment of this invention will be adjusted to an alkaline pH, and additional emulsifier will be added. The above process can be repeated.

One of the remarkable characteristics of the oil-in-water emulsions of the subject invention is that while allowing recovery of volatile organic materials, it also serves as a detackifier for oversprayed paint particles. This allows for the separation of paint particles which will hold as much as 60-80% by weight of the volatile organic materials from the spray booth by either filtration and/or skimming. Filtration of detackified paint and/or lacquer materials can be accomplished by passing the emulsion through a bag filter or the like prior to breaking the emulsion. Likewise, the emulsion may be broken followed by filtering the solids from the organic liquid/volatile organic carrier phase. Typically, these sprayed paint solids will then be incinerated.

One of the most important aspects of this invention, however, is the fact that by using the emulsion of the subject invention in place of water in a conventional water-washed paint spray booth, in excess of 50% of the volatile organic emissions previously leaving the paint spray booth and discharged into the atmosphere can be controlled and recovered.

In order to determine the effectiveness of various oil-in-water emulsion systems the following apparatus was constructed:

A 500 ml gas washing tube was obtained. To the inlet of the washing tube was fitted a small chamber or "fat spot" containing a septum through which organic materials could be injected. The gas washing tube was also fitted with a magnetic stirrer operating at a relatively high rate of speed which was held constant for all tests. The outlet of the gas washing tube was connected to a flame ionization detector which had been previously calibrated to measure all organic vapors as ppm propane.

In each of the examples presented in Table I, 50 microliters of reagent grade toluene was injected through the septum while a constant air flow was bubbled through the washing tube. In all cases emulsions were prepared by adding the indicated oil and surfactant mixture at the dosage indicated in the Table to 300 ml of water in the tube. Measurement of organic vapor exiting the washing tube were recorded based upon the amount of toluene being detected by the flame ionization detector. The total amount of toluene exiting the gas tube after 10 and 20 minute intervals was measured and compared to results obtained with a "blank" or no treatment. Results are shown in Table I.

TABLE I

| Example | Hydrocarbon Oil | % | Surfactant | % | Dosage | % Reduction 10 minutes | % Reduction 20 minutes |
|---|---|---|---|---|---|---|---|
| 1 | Chlor. Paraffin Oil[3] | 54.3 | Petrolsul 745 | 7.7 | | | |
|  | Process Oil 100[1] | 36.2 | Plurafac RA 30 | 1.8 | 0.5 | 39.8 | 42.0 |
| 2 | Chlor. Paraffin Oil[3] | 92.5 | Oleic Acid | 7.5 | 0.5 | 52.7 | — |
| 3 | Process Oil 100 SEC[1] | 90.9 | Sulfonic Acid[3] | 7.4 | | | |
|  |  |  | Plurafac RA 30 | 1.8 | 0.5 | 54.3 | 42.6 |
| 4 | Process Oil 100 SEC[1] | 90.5 | Petrolsul 745 | 7.7 | | | |
|  |  |  | Plurafac RA 30 | 1.8 | 0.5 | 48.3 | 41.1 |
| 5 | Process Oil 100 SEC[1] | 96.2 | Sulfonic Acid[3] | 3.8 | 0.5 | 39.8 | 39.3 |
| 6 | Process Oil 100 SEC[1] | 90.9 | Sulfonic Acid[3] | 9.1 | 0.5 | 47.7 | 40.2 |
| 7 | Process Oil 100 SEC[1] | 92.6 | Sulfonic Acid[3] | 7.4 | 0.5 | 44.9 | 40.5 |
| 8 | Process Oil 100 SEC[1] | 93.0 | Oleic Acid | 7.0 | 0.5 | 52.1 | 40.8 |
| 9 | Process Oil 100 SEC[1] | 93.0 | Oleic Acid | 7.0 | 0.5 | 43.0 | 38.4 |
| 10 | Process Oil 100 SEC[1] | 93.0 | Oleic Acid | 7.0 | 0.5 | 46.5 | 39.2 |
| 11 | Process Oil 100 SEC[1] | 93.0 | Oleic Acid | 7.0 | 0.5 | 52.6 | 42.5 |
| 12 | Process Oil 100 SEC[1] | 86.0 | Petrolsul 745 | 8.0 | | | |
|  |  |  | Oleic Acid | 4.0 | | | |
|  |  |  | Plurafac RA 30 | 2.0 | 0.5 | 44.4 | 39.2 |
| 13 | Process Oil 100 SEC[1] | 89.9 | Petrolsul 745 | 10.1 | 0.5 | 48.8 | 40.8 |
| 14 | Process Oil 100 SEC[1] | 84.2 | Oleic Acid | 6.3 | | | |
|  |  |  | Petrolsul 745 | 9.5 | 0.5 | 54.4 | — |
| 15 | Chlor. Paraffin Oil[3] | 95.7 | Chlor. Stearic Acid | 4.3 | 0.5 | 48.4 | 49.9 |
| 16 | Chlor. Paraffin Oil[3] | 91.9 | Chlor. Stearic Acid | 8.1 | 0.5 | 64.1 | 56.3 |
| 17 | Chlor. Paraffin Oil[4] | 99.0 | Oleic Acid | 1.0 | 1.0 | 44.4 | 53.7 |
| 18 | Chlor. Paraffin Oil[4] | 98.0 | Oleic Acid | 2.0 | 1.0 | 51.7 | 56.4 |
| 19 | Chlor. Paraffin Oil[4] | 92.6 | Oleic Acid | 7.4 | 1.0 | 65.7 | 64.2 |
| 20 | Chlor. Paraffin Oil[4] | 96.2 | Oleic Acid | 3.8 | 1.0 | 60.4 | 60.6 |
| 21 | Chlor. Paraffin Oil[3] | 96.2 | Oleic Acid | 3.8 | 1.0 | 61.8 | 65.1 |
| 22 | Chlor. Paraffin Oil[2] | 96.2 | Oleic Acid | 3.8 | 1.0 | 51.1 | 55.8 |
| 23 | Process Oil 100 SEC[1] | 95.7 | Oleic Acid | 4.3 | 1.0 | 57.9 | 59.8 |

TABLE I-continued

| Example | Hydrocarbon Oil | % | Surfactant | % | Dosage | % Reduction 10 minutes | % Reduction 20 minutes |
|---|---|---|---|---|---|---|---|
| 24 | Process Oil 100 SEC[1] | 48.1 | Oleic Acid | 3.8 | 1.0 | 66.9 | 57.5 |
|  | Chlor. Paraffin Oil[4] | 48.1 |  |  |  |  |  |
| 25 | Process Oil 100 SEC[1] | 48.1 | Oleic Acid | 3.8 | 1.0 | 56.2 | 53.6 |
|  | Chlor. Paraffin Oil[5] | 48.1 |  |  |  |  |  |
| 26 | Process Oil 100 SEC[1] | 48.1 | Oleic Acid | 3.8 | 1.0 | 48.3 | 52.8 |
|  | Chlor. Paraffin Oil[2] | 48.1 |  |  |  |  |  |
| 27 | Process Oil 100 SEC[1] | 48.1 | Oleic Acid | 3.8 | 0.5 | 30.3 | 29.2 |
|  | Chlor. Paraffin Oil[2] | 48.1 |  |  |  |  |  |
| 28 | Chlor. Paraffin Oil[1] |  | Mix of Oleic Acid and sulfonates |  | 0.5 | 36.6 | 23.2 |
| 29 | Chlor. Paraffin Oil[1] |  | Mix of Oleic Acid and sulfonates |  | 1.0 | 55.1 | 50.8 |
| 30 | Chlor. Paraffin Oil[1] |  | Mix of Oleic Acid and sulfonates |  | 1.0 | 55.1 | 52.1 |
| 31 | Chlor. Paraffin Oil[1] |  | Mix of Oleic Acid and sulfonates |  | 0.5 | 35.5 | 33.3 |
| 32 | Chlor. Paraffin Oil[1] |  | Mix of Oleic Acid and sulfonates |  | 0.5 | 29.5 | 33.4 |
| 33 | Chlor. Paraffin Oil[1] |  | Mix of Oleic Acid and sulfonates |  | 1.0 | 66.6 | 67.9 |
| 34 | Chlor. Paraffin Oil[1] |  | Mix of Oleic Acid and sulfonates |  | 0.5 | 41.6 | 44.1 |
| 35 | Chlor. Paraffin Oil[4] | 88.9 | Oleic Acid | 11.1 | 1.0 | 65.1 | 59.3 |
| 36 | Chlor. Paraffin Oil[4] | 76.9 | Oleic Acid | 23.1 | 1.0 | 59.0 | 55.5 |
| 37 |  |  | Oleic Acid | 100 | 1.0 | 48.2 | 42.0 |
| 38 | Process Oil 100 SEC[1] | 9.6 | Oleic Acid | 3.9 | 0.5 | 56.1 | 48.6 |
|  | Chlor. Paraffin Oil[3] | 86.5 |  |  |  |  |  |
| 39 | Process Oil 100 SEC[1] | 19.2 | Oleic Acid | 3.8 | 0.5 | 53.8 | 49.2 |
|  | Chlor. Paraffin Oil[3] | 76.9 |  |  |  |  |  |
| 40 | Process Oil 100 SEC[1] | 28.5 | Oleic Acid | 3.9 | 0.5 | 42.5 | 43.6 |
|  | Chlor. Paraffin Oil[3] | 57.7 |  |  |  |  |  |
| 41 | Chlor. Paraffin Oil[3] | 90.9 | Oleic Acid | 9.1 | 0.5 | 64.7 | 54.2 |
| 42 | Chlor. Paraffin Oil[3] | 83.3 | Oleic Acid | 16.7 | 0.5 | 64.3 | 52.7 |
| 43 | Chlor. Paraffin Oil[3] | 76.9 | Oleic Acid | 23.1 | 0.5 | 60.0 | 53.6 |
| 44 | Chlor. Paraffin Oil[3] | 76.9 | Oleic Acid | 23.1 | 0.5 | 52.3 | 45.4 |
| 45 | Process Oil 100 SEC[1] | 90.9 | Oleic Acid | 9.1 | 0.5 | 61.9 | 47.6 |
| 46 | Process Oil 100 SEC[1] | 93.0 | Oleic Acid | 7.0 | 0.5 | 56.6 | 49.4 |
| 47 | Process Oil 100 SEC[1] | 88.9 | Oleic Acid | 11.1 | 0.5 | 62.1 | 47.4 |
| 48 | Process Oil 100 SEC[1] | 87.0 | Oleic Acid | 13.0 | 0.5 | 62.3 | 47.4 |
| 49 | Process Oil 100 SEC[1] | 83.3 | Oleic Acid | 16.7 | 0.5 | 60.4 | 45.1 |
| 50 | Process Oil 100 SEC[1] | 80.0 | Oleic Acid | 20.0 | 0.5 | 61.1 | 44.6 |
| 51 | Process Oil 100 SEC[1] | 92.6 | Oleic Acid | 7.4 | 0.5 | 62.1 | — |
| 52 | Process Oil 100 SEC[1] | 95.7 | Stearic Acid | 4.3 | 3.0 | 40.5 | 60.4 |
| 53 | Process Oil 100 SEC[1] | 95.7 | Palmitic Acid | 4.3 | 3.0 | 53.6 | 62.7 |
| 54 | Process Oil 100 SEC[1] | 95.7 | Myristic Acid | 4.3 | 3.0 | 81.0 | 79.4 |
| 55 | Process Oil 100 SEC[1] | 95.7 | Lauric Acid | 4.3 | 3.0 | 91.5 | 88.1 |
| 56 | Process Oil 100 SEC[1] | 95.7 | Tall Oil Acid | 4.3 | 3.0 | 83.7 | 84.8 |
| 57 | Process Oil 100 SEC[1] | 95.7 | Tallow Acids | 4.3 | 3.0 | 83.8 | 82.7 |
| 58 | Process Oil 500 SEC[8] | 95.7 | Oleic Acid | 4.3 | 3.0 | 89.2 | 83.8 |
| 59 | Process Oil 1200 SEC[9] | 95.7 | Oleic Acid | 4.3 | 3.0 | 88.3 | 84.0 |
| 60 | Markol 82 White Oil[6] | 95.7 | Oleic Acid | 4.3 | 3.0 | 73.3 | 77.9 |
| 61 | Mineral Seal Oil | 95.7 | Oleic Acid | 4.3 | 3.0 | 89.9 | 84.0 |
| 62 | Process Oil 100 SEC[1] | 99.0 | Oleic Acid | 1.0 | 3.0 | 82.0 | 83.5 |
| 63 | Process Oil 100 SEC[1] | 95.7 | Oleic Acid | 4.3 | 3.0 | 82.0 | 82.5 |
| 64 | Process Oil 100 SEC[1] | 90.9 | Oleic Acid | 9.1 | 3.0 | 95.1 | 89.4 |
| 65 | Chlor. Paraffin Oil[11] | 92.5 | Oleic Acid | 7.5 | 0.5 | 62.1 | 53.9 |
| 66 | Process Oil 100 SEC[1] | 92.4 | Oleic Acid | 7.6 | 0.5 | 39.1 | 39.3 |
| 67 | Chlor. Paraffin Oil[7] | 92.5 | Oleic Acid | 7.5 | 0.5 | 52.6 | 50.2 |
| 68 | Process Oil 100 SEC[1] | 95.2 | Ethomeen $C_{12}$[7] | 4.8 | 0.5 | 39.6 | 38.0 |
| 69 | Process Oil 100 SEC[1] | 95.6 | Ethomeen $C_{12}$[7] | 4.0 | 0.5 | 34.1 | 37.1 |
|  |  |  | Dioleate Ester[8] | 0.4 |  |  |  |
| 70 | Process Oil 100 SEC[1] | 98.7 | Fatty Alcohol Sulfate[9] | 1.3 | 0.5 | 47.3 | 41.9 |
| 71 | Process Oil 100 SEC[1] | 93.0 | Oleic Acid | 7.0 | 0.5 | 32.3 | 39.7 |
| 72 | Process Oil 100 SEC[1] | 94.3 | Oleic Acid | 0.9 | 0.5 | 58.0 | 42.3 |
|  |  |  | Lauric Acid | 4.7 | 0.5 | 58.0 | 42.3 |
| 73 | Process Oil 100 SEC[1] | 94.3 | Lauric Acid | 4.7 | 0.5 | 46.1 | 33.9 |
|  |  |  | Ethomeen $C_{12}$[7] | 0.9 |  |  |  |
| 74 | Process Oil 100 SEC[1] | 94.3 | Lauric Acid | 4.7 | 0.5 | 50.7 | 42.4 |

TABLE I-continued

| Example | Hydrocarbon Oil | % | Surfactant | % | Dosage | % Reduction 10 minutes | % Reduction 20 minutes |
|---------|-----------------|---|------------|---|--------|------------------------|------------------------|
|         |                 |   | Ethomeen $C_{12}$[7] | 0.9 |        |                        |                        |

Hydrocarbon Oils
[1]Telura ® 323 aliphatic pertroleum-based process oil 100 sec
[2]CW 170 42% by weight as $Cl_2$, chlorinated paraffin oil MW 565, 1050 cps (Kiel Division, Ferro Corporation)
[3]CW 52 52% by weight as $Cl_2$, chlorinated paraffin oil 3600 cps (Kiel Division, Ferro Corporation)
[4]CW 8560 60% by weight chlorinated paraffin oil, MW 405 10500 cps (Kiel Division, Ferro Corporation)
[5]Kloro 7000 70% by weight chlorinated paraffin oil, 21900 cps (Kiel Division, Ferro Corporation)
[6]Markol 82 - Highly aliphatic viscous white oil (Exxon Company)
[7]Kloro 6000 60% by weight chlorinated paraffin oil, low viscosity (Kiel Division, Ferro Corporation)
[8]Aliphatic petroleum-based process oil 500 sec, viscosity 1050 cps
[9]Aliphatic petroleum-based process oil 1200 sec, viscosity 2520 cps
[10]Mineral Seal Oil
[11]CW 35 35% by weight as $Cl_2$, chlorinated paraffin oil Emulsifiers
[1]Oleic Acid
[2]Lauric Acid
[3]Dodecylbenzene sulfonic acid
[4]Petroleum sulfonate (Petrosul 745)
[5]Polyoxyethylated fatty alcohol (Plurafac RA 30)
[6]Chlorinated stearic acid
[7]Ethomeen $C_{12}$ - Diethoxylated coco fatty amine
[8]Polyethylenoglycol (2000) dioleate ester
[9]Ammonium ethoxylated fatty alcohol sulfate
[10]Stearic Acid
[11]Palmitic Acid
[12]Myristic Acid
[13]Lauric Acid
[14]Tall Oil Acid
[15]Tallow Acid Tests of various emulsion materials were conducted using a pilot sized wet walled spray booth. Materials tested include the following mixtures:

EXAMPLE 75 THRU 97

I.

23.69 pts. CW 52 chlorinate paraffin oil
15.79 pts. 100 SEC aliphatic petroleum oil
3.36 pts. Petroleum sulfonate
0.79 pts. Plurafac RA 30

II.

20.68 pts. 100 SEC aliphatic petroleum oil
2.07 pts. dodecylbenzene sulfonic acid

III.

21.72 pts. 100 SEC aliphatic petroleum
1.76 pts. dodecylbenzene sulfonic acid
0.42 pts. Plurafac RA 30

IV.

687.8 pts. 100 SEC aliphatic petroleum oil
51.8 pts. oleic acid

V.

727.4 pts. CW 52 chlorinated paraffin oil
59.0 pts. oleic acid

VI.

94.3 pts. 100 SEC aliphatic petroleum oil
4.7 pts. lauric acid
1.0 pts. oleic acid In all cases except as noted the material being sprayed was 27% by volume black lacquer. Certain examples which employ heptane in place of this material are noted. Dosages of mixtures I–VI used in water to form the respective emulsion tested, as well as results obtained are reported in Table II. From the results shown the oil-in-water emulsions of this invention are effective in capturing volatile organic paint carriers.

TABLE II

| Test No. | Treatment | % Treatment | pH | Spray Rate | Calculated[1] Air flow cubic ft/min | ppm Measured | ppm[2] Corrected | % Reduction from Control |
|----------|-----------|-------------|-----|------------|-------------------------------------|--------------|------------------|--------------------------|
| 75 | Control[4] | — | 10 | 0.96 | 480 | 277.6 | 278 | 0 |
| 76 | Control[4] | — | 10 | 0.99 | 540 | 275.0 | 300 | 0 |
| 77 | Control[4] | — | 10 | 0.99 | 500 | 333.5 | 333.5[3] | 0 |
| 78 | Control[4] | — | 10 | 0.99 | 595 | 250.6 | 301 | 0 |
| 79 | I[5] | 1 | 10 | 0.99 | 480 | 253.3 | 235 | 20.9 |
| 80 | II[4,5] | 1 | 10 | 0.99 | 580 | 217 | 254 | 14.5 |
| 81 | III[5] | 1 | 10 | 0.99 | 720 | 160.4 | 233 | 21.5 |
| 82 | III | 3 | 10 | 0.99 | 720 | 160.3 | 233 | 21.5 |
| 83 | III | 0.5 | 10 | 0.99 | 723 | 182.3 | 266 | 10.4 |
| 84 | IV | 1 | 10 | 0.99 | 540 | 250.2 | 273 | 8.1 |
| 85 | IV[4] | 1 | 10 | 0.99 | 557 | 241.1 | 271 | 8.8 |
| 86 | V | 1 | 10 | 0.99 | 520 | 365 | 320 | 0 |
| 87 | III | 1 | 10 | 0.99 | 930 | 200 | 375 | 16.7 |
| 89 | IV[6] | 1 | 10 | 0.99 | 780 | 151 | 238 | 19.9 |
| 90 | IV[5,6] | 0.5 | 10 | 0.99 | 490 | 260 | 257 | 13.5 |
| 91 | IV[5] | 1.0 | 10 | 0.99 | 860 | 149 | 258 | 13.5 |
| 92 | IV[5] | 1 | 10 | 0.93 | 857 | 132 | 243 | 18.2 |
| 93 | IV | 3 | 8.4 | 0.99 | 920 | 151.1 | 280 | 5.7 |
| 94 | Control | — | 8.4 | 0.99 | 156 | 678.3 | 678 | 0 |
| 95 | IV | 4 | 8.4 | 0.99 | 152 | 553.5 | 554 | 18.3 |
| 96 | Control | — | 8.4 | 0.99 | 280 | 369.7 | 370 | 0 |

TABLE II-continued

| Test No. | Treatment | % Treatment | pH | Spray Rate | Calculated[1] Air flow cubic ft/min | ppm Measured | ppm[2] Corrected | % Reduction from Control |
|---|---|---|---|---|---|---|---|---|
| 97 | IV | 4 | 8.4 | 0.99 | 280 | 332.5 | 333 | 10.0 |

[1]Measured air flow × 0.8 = Actual Air Flow
[2]Corrected ppm =

Measured ppm × $\frac{\text{Actual Air Flow}}{500 \text{ ft/min.}}$ × 1.0 gr/min × Spray Rate

[3]Increase in volatile organic level corresponds to paint sludge removal
[4]2000 ppm water-soluble cationic paint detackification polymer added
[5]Silicone based anti-foam added as needed
[6]EDTA added to water at hardness level × 10% excess

EXAMPLES 98 thru 117

Further experiments were run on a wet wall type spray booth manufactured by the Binks Manufacturing Company as their Model PE47T. When exiting the booth, vapors were analyzed using a Hewlett Packard Model 5880 gas chromatograph equipped with a 10% OV 101 column and a flame ionization detector. Emulsions were prepared by adding the indicated amount of a composition consisting of 93% 100 SEC aliphatic process oil and 7% oleic acid to the paint spray booth water (Comp. VII). In all cases, the material being sprayed was a 27% by volume solids black dispersion lacquer having a code of L-9857 available from the PPG Corp. Results are shown in Table III. This experiment confirms the ability of the oil-in-water emulsions of this invention to reduce volatile organic emissions from paint spray booth systems.

50.7 grams/minute of 27% black dispersion lacquer. The air flow was 1980 cu. ft./minutes.

During the course of the testing, the average corrected ppm of volatile organic carriers in the air was 194.7. During the course of the test, 13,131 grams of paint were sprayed. At 66% volatiles, this amounts to 8667 grams of volatile organic carriers sprayed during the test. At the end of the test, 2271 grams of volatile organic carriers were detected in the emulsion.

While the preferred embodiment of the invention has been described, it will be understood that other emulsion systems may be used for removing volatile organic paint carriers.

For instance, it is possible that the starting emulsion be formed with a fatty amine emulsifier which produces a stable emulsion at an acid pH. Such emulsions can then be broken by adjusting the pH into the alkaline range.

TABLE III

| Test | Treatment | % Treatment | pH | Spray Rate | Air Flow | ppm Measured Actual | ppm Corrected | % Reduction from Control | % Reduction from Theoretical |
|---|---|---|---|---|---|---|---|---|---|
| 98 | Control | — | | 53.0 | 3080 | 1446 | 136 | — | 30.9–35.2 |
| 99 | Comp. VII | 1 | | 50.0 | 3080 | 1331 | 133 | 0 | 32.5–35.7 |
| 100 | Comp. VII | 4 | | 49.9 | | 117.3 | 117 | 14.0 | 40.0–44.3 |
| 101 | Control | — | | 45.5 | | 125.7 | 138 | — | 29.9–34.3 |
| 102 | Control | — | | 47.9 | | 128 | 132 | — | 33.0–37.1 |
| 103 | Control[1] | — | | 49.6 | | 128 | 128 | — | 35.0–39.0 |
| 104 | Comp. VII | 8 | | 49.3 | | 122.6 | 123 | 8.2 | 37.6–41.4 |
| 105 | Comp. VII[2] | 4 | | 48.0 | | 127.4 | 132 | 1.5 | 33.0–37.1 |
| 106 | Comp. VII[2] | 4 | | 48.7 | | 115. | 118 | 11.9 | 40.1–43.8 |
| 107 | Comp. VII[2] | 2 | | 42.5 | | 117.7 | 139 | 0 | 29.4–33.8 |
| 108 | Comp. VII | 4 | | 47.7 | | 127.9 | 134.1 | 0 | 32.0–36.2 |
| 109 | Comp. VII[3] | 4 | | 47.3 | | 126.1 | 133 | 0 | 32.5–36.7 |
| | w/sludge recirculated | | | | | 134.7 | 142 | 0 | 27.9–32.4 |
| 110 | Comp. VII | 4 | | 49.7 | | 133.9 | 135 | 0 | 31.5–35.7 |
| 111 | Control | — | 8.4–8.8 | 50.6 | | 140.9 | — | — | |
| 112 | Control | — | 8.4 | 49.3 | 3300 | 139.5 | — | — | |
| 113 | Comp. VII | 4 | 8.4–8.5 | 48.3 | 3080 | 126.1 | 131 | 5.8 | 33.5–37.6 |
| 114 | Control | — | 8.2–8.4 | 50.1 | | 138.6 | 138.6 | — | 29.4 |
| | | | | 69.9 | | 139.7 | 139.7 | — | 49.4 |
| | | | | 90.8 | | 235.0 | 235.0 | — | 34.4 |
| | | | | 109.8 | | 274.2 | 274.2 | — | 36.6 |
| | | | | 237 | | 561.4 | 561.4 | — | 39.8 |
| 115 | Comp. VII | 4 | | 51.8 | | 124.9 | 121 | 12.9 | 37.9 |
| | | | | 70.1 | | 177.0 | 177 | 0 | 35.4 |
| | | | | 106.5 | | 255.3 | 263 | 4.0 | 39.1 |
| | | | | 231.6 | | 505.3 | 517 | 7.8 | 44.5 |
| 116 | Comp. VII | 4 | | 51.2 | 1815 | 204.2 | 204 | 5.5 | 44.1 |
| 117 | Blank | — | | 51.1 | 1815 | 216.3 | 216 | — | 40.8 |

[1]2000 ppm water-soluble cationic paint detackification polymer.
[2]Silicon-based antifoam added as needed.
[3]In this instance, over-sprayed paint solids were not removed.

ACTUAL EXAMPLE

This illustrates the invention being tested in a small scale paint spray booth, Binks Model P47T wet wall type.

The treatment was a 30% emulsion, the oil phase was made up of 93 parts of 100 SEC oil and 7% oleic acid. The pH of the system was 8.5–9.0. The spray rate was In a similar vein, the starting emulsions may be broken by the use of a well-known deemulsifiers either alone or in combination with electrostatic deemulsifier chambers. This embodiment, while providing a workable system, is not preferred since it adds extraneous organic material to the hydrophilic liquid used in the paint spray booth sump.

What is desired to be protected by Letters Patent of the United States is as follows:

1. In an improved method for recovering volatile organic paint carrier from paint spray booths of the type comprising a chamber, a duct system for passing air down through such chamber to remove volatile organic paint carrier and over-sprayed particles, a sump containing a circulating hydrophilic liquid located at the bottom of the chamber removing volatile organic paint carrier and paint particles from the air containing them, the improvement which comprises using as the hydrophilic liquid in the sump of the spray booth an oil-in-water emulsion maintained at a pH value of from 7.5–12 which has the following composition:

(a) 1–50% by weight of an organic liquid having a boiling point of at least 150° C.;
(b) 0.1–30% by weight of the organic liquid of a sulfonate-free oil-in-water emulsifier;
(c) balance, water, said emulsion being rapidly broken into a separate oil phase and a separate aqueous phase by adjusting the pH of the emulsion to below 6.5 and recovering the volatile organic paint carrier from the oil phase reforming the emulsion by the oil phase and aqueous phase combining at a pH of 7.5–12.

2. The oil-in-water emulsion of claim 1 wherein the oil-in-water emulsion comprises 4–30% by weight of an organic liquid having a boiling point of at least 300° C.; 1.5–10% by weight of the organic liquid of a sulfonate-free oil-in-water emulsifier; and balance, water.

3. The oil-in-water emulsion of claim 2, wherein the oil-in-water emulsifier is oleic acid and the organic liquid is a 100 SEC primarily aliphatic process oil.

4. The oil-in-water emulsion of claim 1, wherein the organic liquid has a boiling point of at least 300° C.

5. The oil-in-water emulsion of claim 1, wherein the emulsifier for the oil-in-water emulsion is selected from the group consisting of $C_{12}$–$C_{30}$ saturated and unsaturated fatty acids.

6. The oil-in-water emulsion of claim 5, wherein the oil-in-water emulsion has a pH in the range of 8–11 and is rapidly broken when the pH of the emulsion is reduced to a value of from 3.0–6.

7. The oil-in-water emulsion of claim 6, wherein the oil-in-water emulsifier is oleic acid and the organic liquid is a 100 SEC primarily aliphatic process oil.

* * * * *

UNITED STATES PATENT AND TRADEMARK OFFICE
CERTIFICATE OF CORRECTION

PATENT NO. : 4,378,235
DATED : March 29, 1983
INVENTOR(S) : David R. Cosper & William H. Lindenberger It is certified that error appears in the above-identified patent and that said Letters Patent is hereby corrected as shown below:

Column 13, Line 24, Claim 1; to Column 14, Line 1, Claim 1

"organic paint carrier from the oil phase reforming the emulsion by the oil phase and aqueous phase combining" should read --organic paint carrier from the oil phase, reforming the emulsion by combining the oil phase and aqueous phase--.

Signed and Sealed this

Fourteenth Day of June 1983

[SEAL]

Attest:

DONALD J. QUIGG

Attesting Officer　　　Acting Commissioner of Patents and Trademarks